United States Patent
Bharat et al.

(10) Patent No.: US 8,825,645 B1
(45) Date of Patent: *Sep. 2, 2014

(54) DETERMINING QUALITY OF LINKED DOCUMENTS

(75) Inventors: Krishna Bharat, San Jose, CA (US); Amit Singhal, Palo Alto, CA (US); Paul Haahr, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/345,276

(22) Filed: Jan. 6, 2012

Related U.S. Application Data

(63) Continuation of application No. 12/840,128, filed on Jul. 20, 2010, now Pat. No. 8,176,056, which is a continuation of application No. 10/879,520, filed on Jun. 30, 2004, now Pat. No. 7,783,639.

(51) Int. Cl.
*G06F 7/00* (2006.01)
*G06F 17/30* (2006.01)

(52) U.S. Cl.
USPC ............ 707/736; 707/737; 707/748; 707/749

(58) Field of Classification Search
USPC .................................. 707/736, 737, 748, 749
See application file for complete search history.

(56) References Cited

U.S. PATENT DOCUMENTS

| | | | |
|---|---|---|---|
| 6,285,999 B1 | 9/2001 | Page | |
| 6,601,075 B1 * | 7/2003 | Huang et al. | 707/748 |
| 6,636,848 B1 | 10/2003 | Aridor et al. | |
| 6,671,711 B1 * | 12/2003 | Pirolli et al. | 709/200 |
| 6,738,678 B1 * | 5/2004 | Bharat et al. | 700/48 |
| 6,799,176 B1 | 9/2004 | Page | |
| 7,058,628 B1 | 6/2006 | Page | |
| 7,783,639 B1 | 8/2010 | Bharat et al. | |
| 2005/0071741 A1 | 3/2005 | Acharya et al. | |
| 2005/0262062 A1 | 11/2005 | Xia | |

OTHER PUBLICATIONS

Co-pending U.S. Appl.No. 12/840,128, filed Jul. 20, 2010 entitled "Determining Quality of Linked Documents" by Bharat et al., 38 pages.

* cited by examiner

*Primary Examiner* — Mariela Reyes
(74) *Attorney, Agent, or Firm* — Harrity & Harrity, LLP

(57) ABSTRACT

A ranking component ranks documents, such as web pages or web sites, to obtain a ranking score that defines a quality judgment of the document. The ranking score of a particular document is based on the ranking score of the documents which link to it and based on affiliation among the documents.

20 Claims, 9 Drawing Sheets

DETERMINING QUALITY OF LINKED DOCUMENTS

RELATED APPLICATIONS

This application is a continuation of U.S. patent application Ser. No. 12/840,128, filed Jul. 20, 2010, which is a continuation of U.S. patent application Ser. No. 10/879,520, filed Jun. 30, 2004, now U.S. Pat. No. 7,783,639, the entire disclosures of which are incorporated herein by reference.

BACKGROUND OF THE INVENTION

A. Field of the Invention

The present invention relates generally to information retrieval and, more particularly, to automated techniques for judging the quality of a document.

B. Description of Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

It may be desirable to sort the hits returned by the search engine based on some objective measure of the quality of the hits. Determining an appropriate quality metric for a document such as a web page can be a difficult task. For one thing, the quality of a web page to the user is inherently subjective and depends on the user's interests, knowledge, and attitudes. There is, however, much that can be determined objectively about the relative quality of a web page. One technique for determining the quality of a web page is based on more than the content of the web page. This technique assigns a degree of quality to a web page based on the link structure of the web.

The ability to automatically assign a degree of quality to documents, such as web pages, is an important one that can be used to effectively implement a number of technologies, such as search engines. Accordingly, it would be desirable to improve the assigned quality metrics.

SUMMARY OF THE INVENTION

One aspect consistent with the principles of the invention is directed to a method that includes identifying a plurality of linked documents and assigning ranking scores to the linked documents. The ranking scores are based on the links between the documents and based on affiliation among the documents.

Another aspect includes a device for assigning ranking scores to documents that quantify a quality of the documents. The device includes a collection of linked documents and a set location component to identify affiliations among documents in the collection of linked documents. The device further includes a ranking component that assigns the ranking scores to the documents in the collection based on the links between the documents and based on the identified affiliations among the documents.

Yet another aspect is directed to a search system that includes a search engine to locate a set of documents from a corpus of documents that are relevant to a user search query. The search engine returns the set of documents to the user in an order based on ranking scores associated with the documents in the set of documents. A ranking component computes the ranking scores based on the links between documents in the corpus of documents and based on affiliation among the documents.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

As described herein, a ranking component ranks documents, such as web pages or web sites, to obtain a ranking score that defines a quality judgment of the document. The ranking score of a particular document is based on the ranking score of the documents which link to it and takes into account affiliation between documents.

Figure 1:
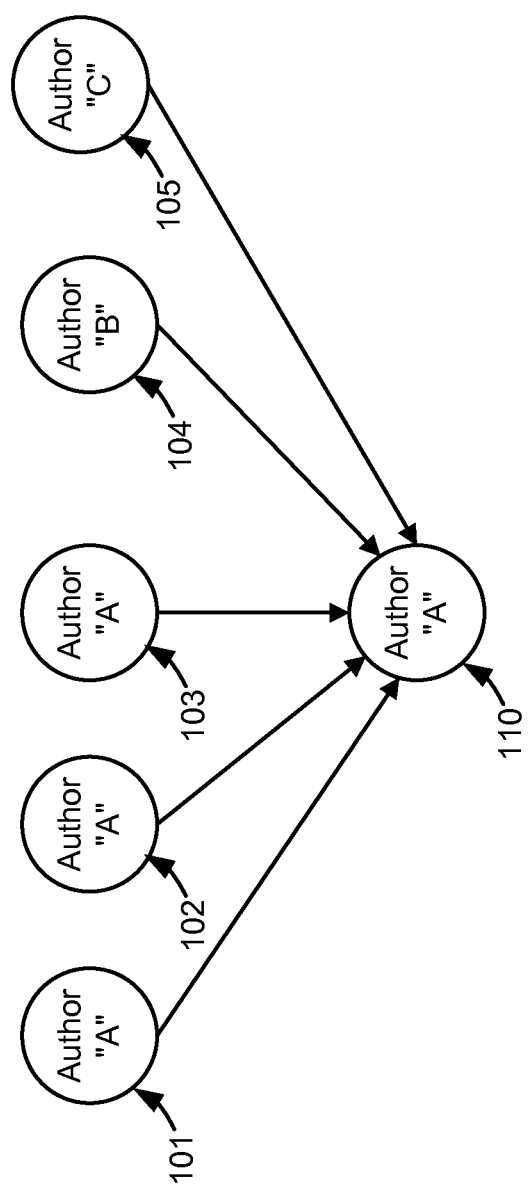
FIG. 1 is a diagram illustrating an exemplary overview of assigning ranking scores consistent with aspects of the invention.

FIG. 1 is a diagram illustrating an exemplary overview of assigning ranking scores consistent with aspects of the inventions. In the situation shown in FIG. 1, in which three documents 101-103 link to another document 110 (links between the documents are shown as lines). Each of documents 101-103 and 110 is authored by the same entity (author "A"). Additionally, document 104, authored by entity "B," and document 105, authored by entity "C", also link to document 110.

It may be reasonable to assume that because document 101 links to document 110, and because both documents are authored by the same entity, the quality ranking score assigned to document 110 should probably be at least the same as or similar to the ranking score of document 101. In other words, knowing the ranking score of document 101 can be useful in setting a lower bound on the quality of other pages (e.g., document 110) that are pointed to by document 101. However, additional links by the same author, such as the links from documents 102 and 103, should not excessively raise the ranking score of document 110. In particular, just because document 110 is linked to by the three documents 101-103, does not necessarily mean that document 110 is three times the quality of documents 101-103.

Documents 104 and 105, on the other hand, may be independently authored and unaffiliated with documents 101-103. The individual endorsements (i.e., links) to document 110, from documents 104 and 105, may be viewed as complimenting each other. Thus, the ranking score contributed by documents 104 and 105 to document 110 may deserve to be handled differently than the ranking scores contributed by documents 101-103.

In general, concepts consistent with aspects of the invention recognize the need to handle the affiliated situation (illustrated by documents 101-103) differently than the unaffiliated situation (illustrated by documents 104 and 105). In one implementation, the portion of the final ranking score for document 110 may be based on a function that produces a value proportional to a Maximum operator applied to the ranking scores of affiliated sets of documents and a Sum operator applied to non-affiliated documents.

Exemplary Network Overview

Figure 2:
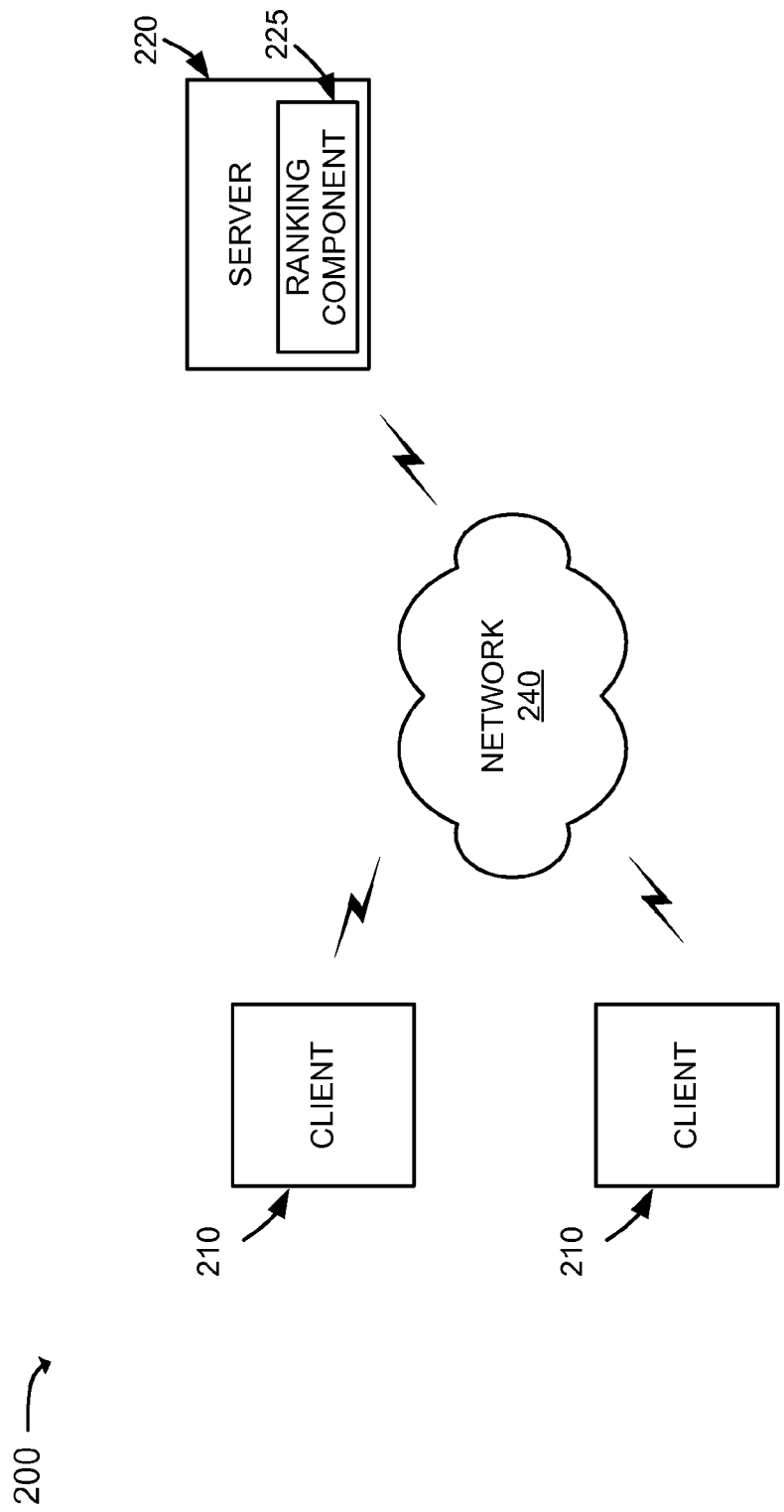
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Server 220 may include server entities that process, search, and/or maintain documents in a manner consistent with the principles of the invention. Clients 210 and server 220 may connect to network 240 via wired, wireless, or optical connections.

In an implementation consistent with the principles of the invention, server 220 may implement a search engine usable by clients 210. In general, in response to a client request, the search engine returns resources, such as web pages, to the client. These resources may be scored and displayed in an order influenced by ranking scores calculated consistent with aspects of the invention.

In one implementation, the ranking scores may be pre-calculated via a ranking component 225. In general, ranking component 225 generates ranking scores that relate to an objective measure of document quality. The operation of ranking component 225 will be described in more detail below.

A document, as the term is used herein, is to be broadly interpreted to include any machine-readable and machine-storable work product. A document may be an e-mail, a blog, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 3:
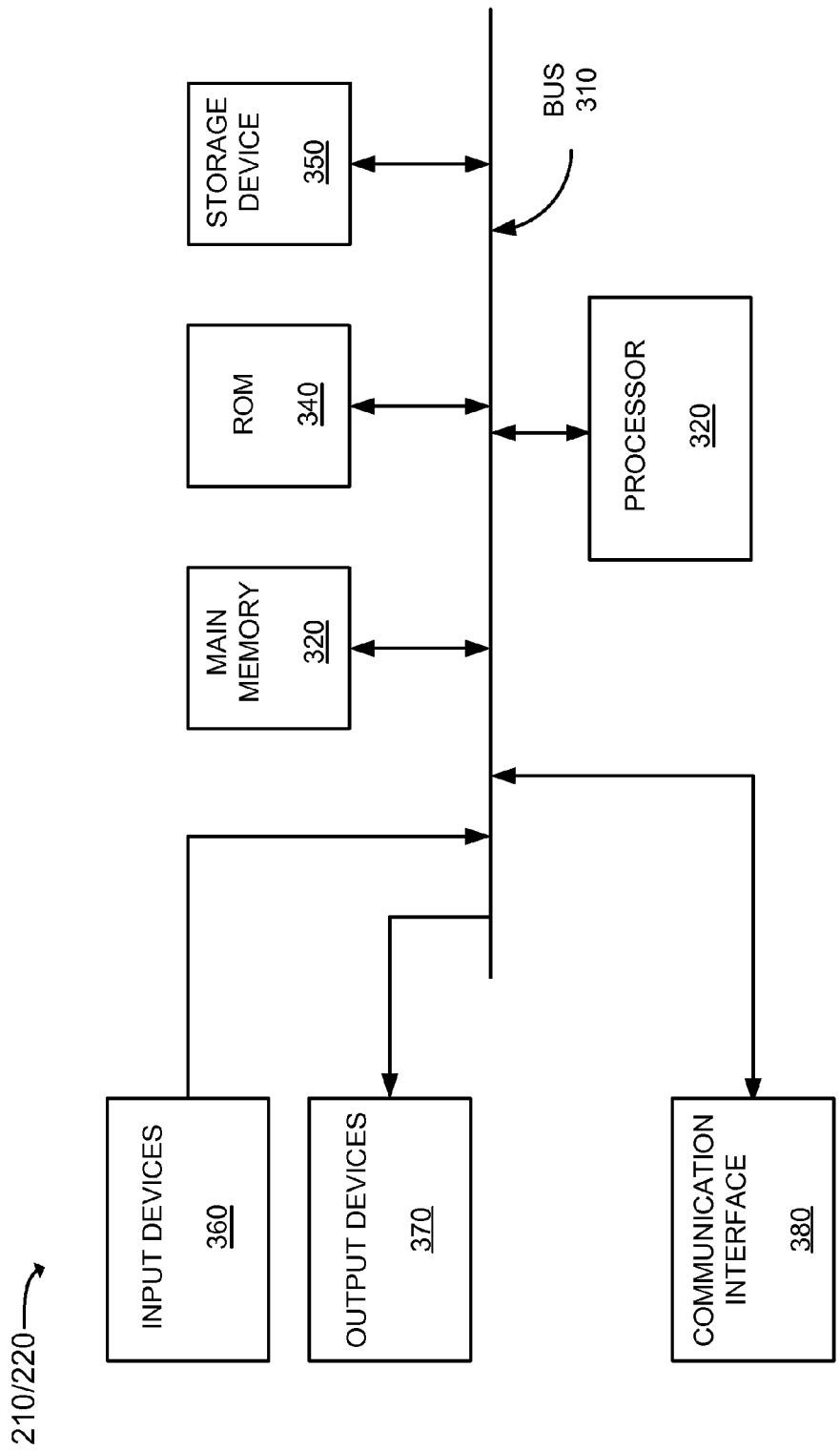
FIG. 3 is an exemplary diagram of a client or server, shown in FIG. 2, according to an implementation consistent with the principles of the invention.

FIG. 3 is an exemplary diagram of a client 210 or server 220 according to an implementation consistent with the principles of the invention. Client/server 210/220 may include a bus 310, a processor 320, a main memory 330, a read only memory (ROM) 340, a storage device 350, one or more input devices 360, one or more output devices 370, and a communication interface 380. Bus 310 may include one or more conductors that permit communication among the components of client/server 210/220.

Processor 320 may include one or more types of conventional processors or microprocessors that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device(s) 360 may include one or more conventional mechanisms that permit a user to input information to client/server 210/220, such as a keyboard, a mouse, a pen, voice recognition and/or biometric mechanisms, etc. Output device(s) 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220, consistent with the principles of the invention, may implement ranking component 225. Ranking component 225 may be stored in a computer-readable medium, such as memory 330. A computer-readable medium may be defined as one or more physical or logical memory devices and/or carrier waves.

The software instructions defining ranking component 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of or in combination with software instructions to implement processes consistent with the present invention. Thus, implementations consistent with the principles of the invention are not limited to any specific combination of hardware circuitry and software.

Ranking Component 225

Figure 4:
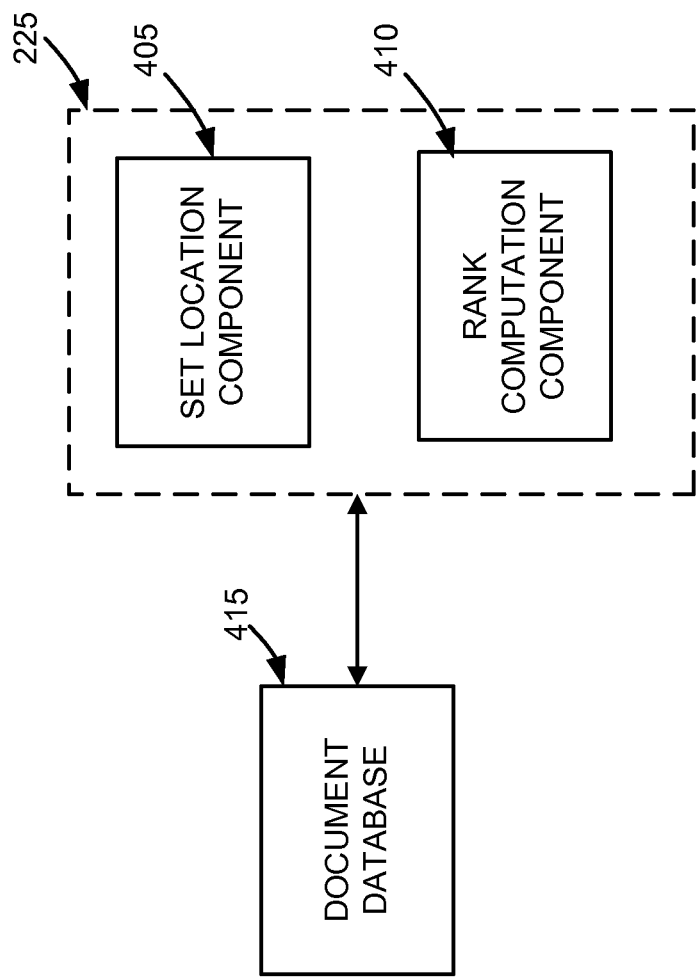
FIG. 4 is a block diagram illustrating an implementation of a ranking component, shown in FIG. 2, in additional detail.

FIG. 4 is a block diagram illustrating an implementation of ranking component 225 in additional detail. Ranking component 225 may include a set location component 405 and a rank computation component 410. The documents on which ranking component 225 operates may be stored in a database 415. Database 415 may be implemented in many different forms, such as a distributed database, a relational database, and so on. In one implementation, database 415 is generated from web documents downloaded from the world wide web.

Set location component 405 may analyze the documents in database 415 and group the documents into sets of related documents. In one implementation, set location component 405 groups documents based on the affiliation of documents with one another. Set location component 405 may automatically arrange documents in sets based on one or more of a number of possible factors. For example, the determination of affiliation can be based on the link graph structure of the documents, traffic patterns to the documents, or similarity of features such as the hostname or the IP address of the documents. As another example, in the context of the web, the link graph structure of the documents can be used to measure affiliation between web documents based on the strength of the linkage between web sites hosting the documents. Additionally, traffic patterns on the web can be used to detect affiliation between web documents that are visited by many users in the same session. Still further, the IP addresses of two web servers can be compared and if the leading two or three components (octets) of the ID address are identical, affiliation can be inferred.

Figure 5:
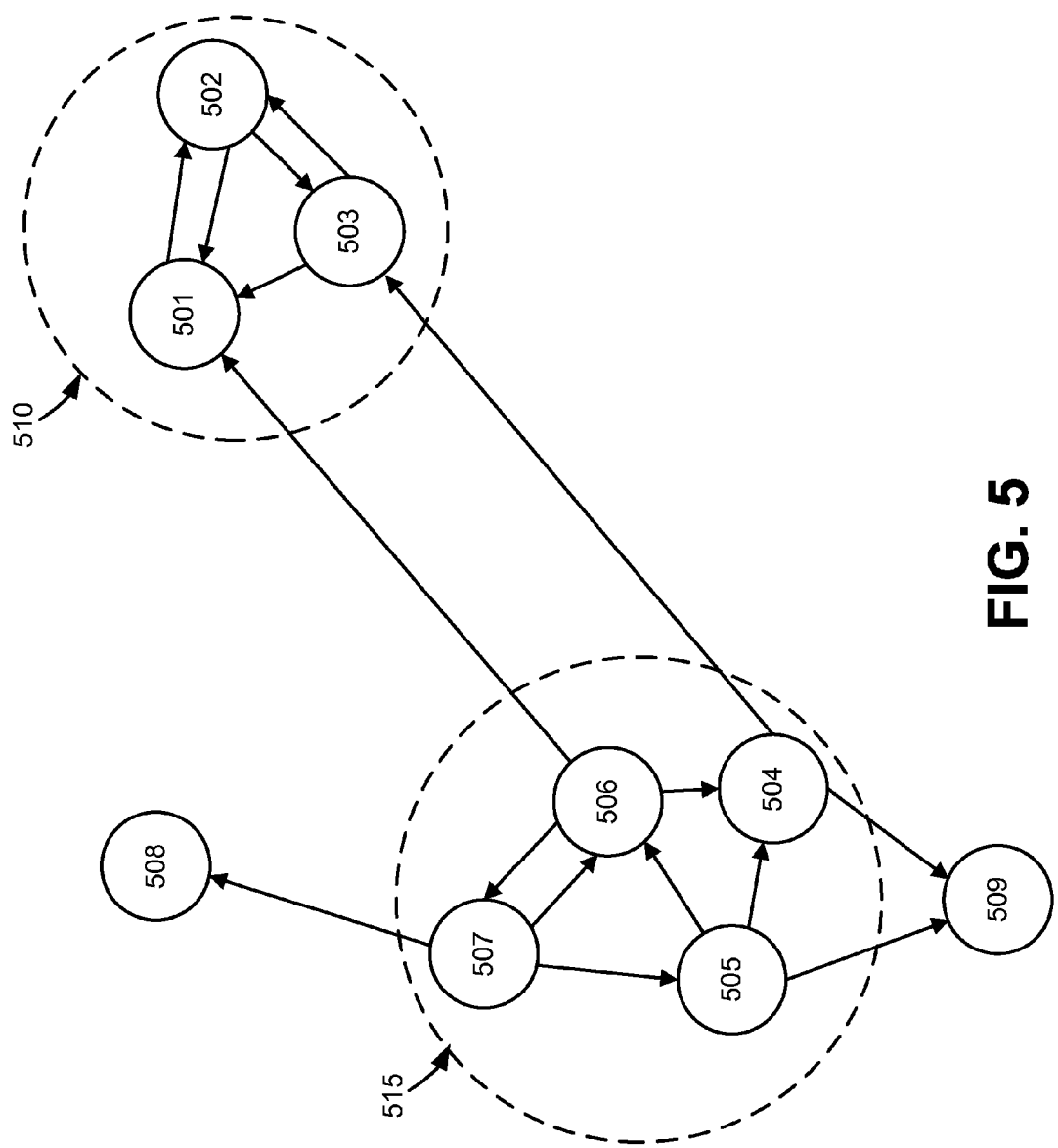
FIG. 5 is diagram illustrating an exemplary corpus of documents classified into affiliated sets.

FIG. 5 is diagram illustrating an exemplary corpus of documents classified into affiliated sets. Documents 501-509 (shown as circles) can be thought of as forming a network graph in which the documents are connected by their links. When the documents are web pages, the links may be in the form of hyperlinks. In FIG. 5, lines with arrows are used to indicate links. A line originating from a first document and leading to a second document may be called a forward or outbound link relative to the first document and indicate that the first document is a linking document. Conversely, a line originating from the second document and leading to the first document may be called a backward or inbound link relative to the first document and indicate that the first document is a linked document. Document 501, for example, has a single outbound link leading to document 502 and three inbound links originating from documents 502, 503, and 506.

As mentioned, set location component 405 may determine that certain documents are affiliated with one another. Sets of affiliated documents are shown as enclosed in dashed circles 510 and 515. Specifically, as illustrated in FIG. 5, documents 501, 502, and 503 are illustrated as being affiliated with one another. Additionally, documents 504, 505, 506, and 507 are illustrated as being affiliated with one another.

Affiliation is illustrated in FIG. 5 as a binary concept in which a document is either in an affiliated set or not in an affiliated set. More generally, however, in some implementations, affiliation may be considered to be a continuous state. In these implementations, affiliated sets, such as sets 510 and 515, may be associated with a measure of affiliation. For example, the documents in set 510 may be strongly affiliated (e.g., if they are all on the same host) while the documents in set 515, although still affiliated, may be considered to be more weakly affiliated (e.g., if the affiliation evidence is weak).

Referring back to FIG. 4, rank computation component 410 may generate ranking scores based on both link information (i.e., illustrated by lines in FIG. 4) and affiliation between documents. The operation of rank component 410 will now be described in more detail.

Rank Component 410

Figure 6:
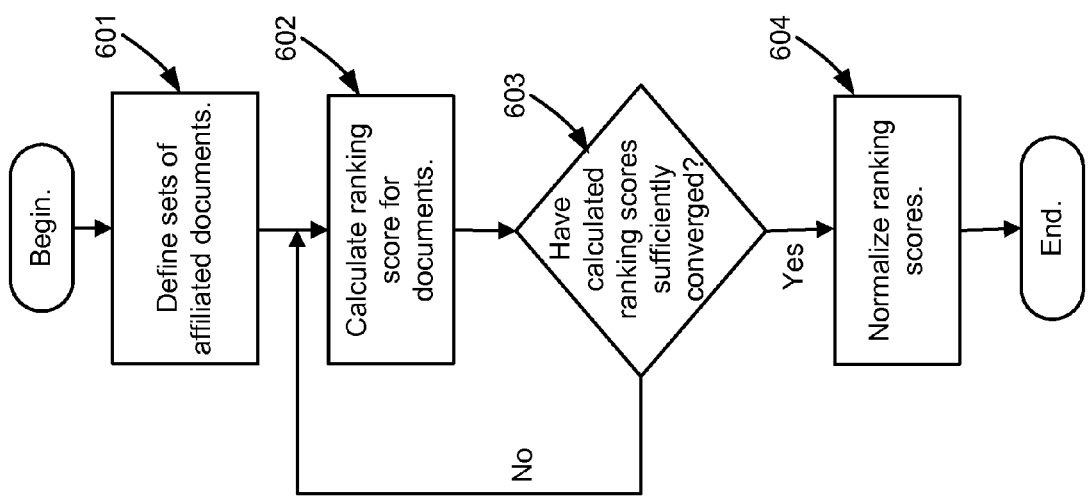
FIG. 6 is a flow chart illustrating operation of the ranking component consistent with aspects of the invention.

FIG. 6 is a flow chart illustrating operation of ranking component 410 consistent with aspects of the invention.

Beginning with a corpus of documents, such as documents in database 415, set location component 405 may define sets of affiliated documents (act 601). The sets may be automatically defined, as discussed above.

Ranking component 410 may then calculate ranking scores for the documents (act 602). The calculation of the ranking scores is an iterative process, and ranking component 410 may re-calculate the ranking scores for the documents based on the previously calculated ranking scores (acts 602 and 603). That is, each pass in calculating the ranks may change the ranking score from the previous pass. A seed ranking score may be defined for some or all of the documents in order to implement the iterative technique. Ranking component 410 may continue to repeat the calculation of the ranking scores in act 602 until the ranks have sufficiently converged (act 603). "Sufficiently converged" can be determined when the ranks generally stop changing, within a certain error tolerance, from one pass to the next. Typically, sets of documents may converge within about 50 iterations. Optionally, the ranking scores may then be normalized to obtain a final ranking score for each document (act 604).

Figure 7:
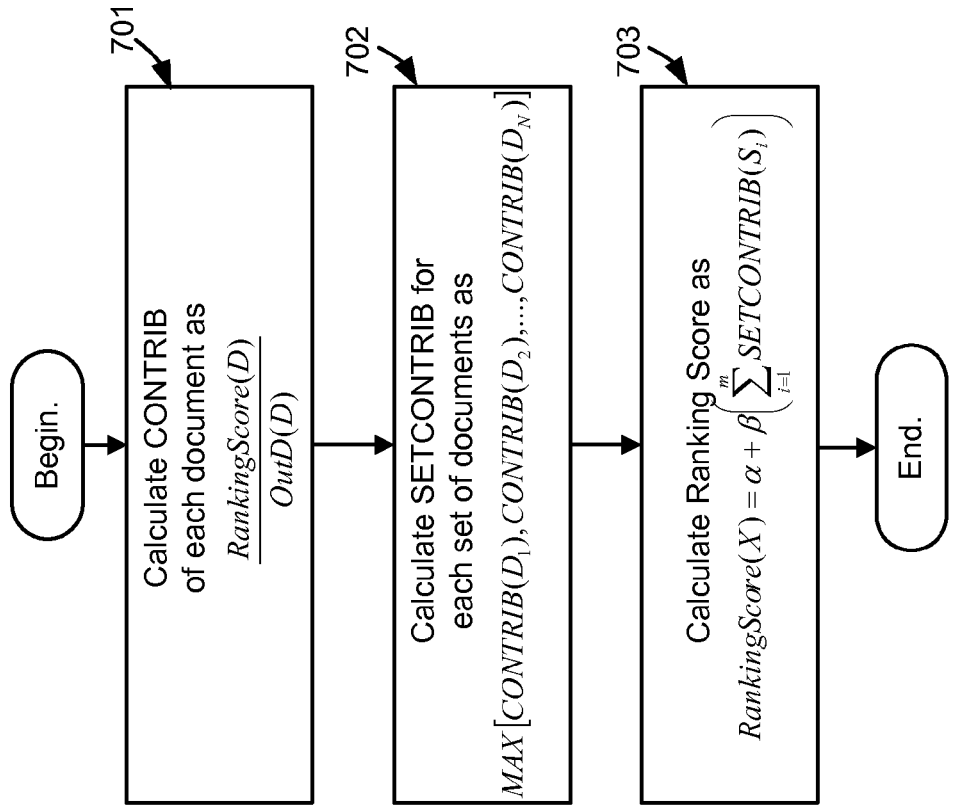
FIG. 7 is a flow chart illustrating operations for calculating ranking scores consistent with an aspect of the invention.

FIG. 7 is a flow chart illustrating operations for calculating ranking scores, as performed in act 602, consistent with an aspect of the invention. In the implementation shown in FIG. 7, the affiliated sets are defined using the binary model. That is, documents are classified as either being in an affiliated set or the document is not affiliated. All affiliated sets are considered to have an equal measure of affiliation.

Ranking component 410 may begin by calculating a contribution value, CONTRIB(D), for each document D as:

$$\text{RankingScore}(D)/\text{Out}D(D), \quad \text{(Eq. 1)}$$

where RankingScore(D) is the ranking score of the document computed in the previous iteration (or the assigned seed value) and OutD(D) (outdegree) is the number of outbound links from the document (act 701). Ranking component 410 may next calculate a second value, SETCONTRIB(S), for each set S of documents as:

$$\text{MAX}[\text{CONTRIB}(D_1), \text{CONTRIB}(D_2), \ldots, \text{CONTRIB}(D_N)], \quad \text{(Eq. 2)}$$

where MAX defines the Maximum operator (i.e., the maximum value of the listed values) and $D_1, D_2, \ldots, D_N$ represents each document 1 through N in set S (act 702). In equation (2), a set may contain one or more documents. Referring to FIG. 5, for example, four sets are illustrated—set 510 and 515, as well as the "sets" defined by documents 508 and 509.

As an example of the implementation of acts 701 and 702, consider document 507 (FIG. 5). CONTRIB for this document may be calculated as the ranking score for this document from the previous iteration divided by the three outbound links (to documents 505, 506, and 508) from this document. The value of SETCONTRIB associated with this document would be the calculated value of CONTRIB if CONTRIB is greater than the value of CONTRIB or documents 504-506; otherwise it would be the largest CONTRIB value for documents 504-506.

The ranking scores for the documents may be computed from the SETCONTRIB values as $$\text{RankingScore}(X) = \alpha + \beta \left( \sum_{i=1}^{m} \text{SETCONTRIB}(S_i) \right). \quad \text{(Eq. 3)}$$

(Act 703). In equation (3), RankingScore(X) is the ranking score of document X, $\alpha$ and $\beta$ are constants, and the sum is taken over the m sets that contain documents that link to document X. For exemplary document 507, m would be two (set 515 and the set defined by document 508). In one implementation, α may be set to 0.1 and β may be set to 0.9. The ranking scores calculated by ranking component 410 using equations (1)-(3) are based on the link structure of the documents and on a binary measure of affiliation between the documents. Although the operations of rank component 410 were described in a particular order, one of ordinary skill in the art will recognize that the operations could be performed in a different order or simultaneously.

Figure 8:
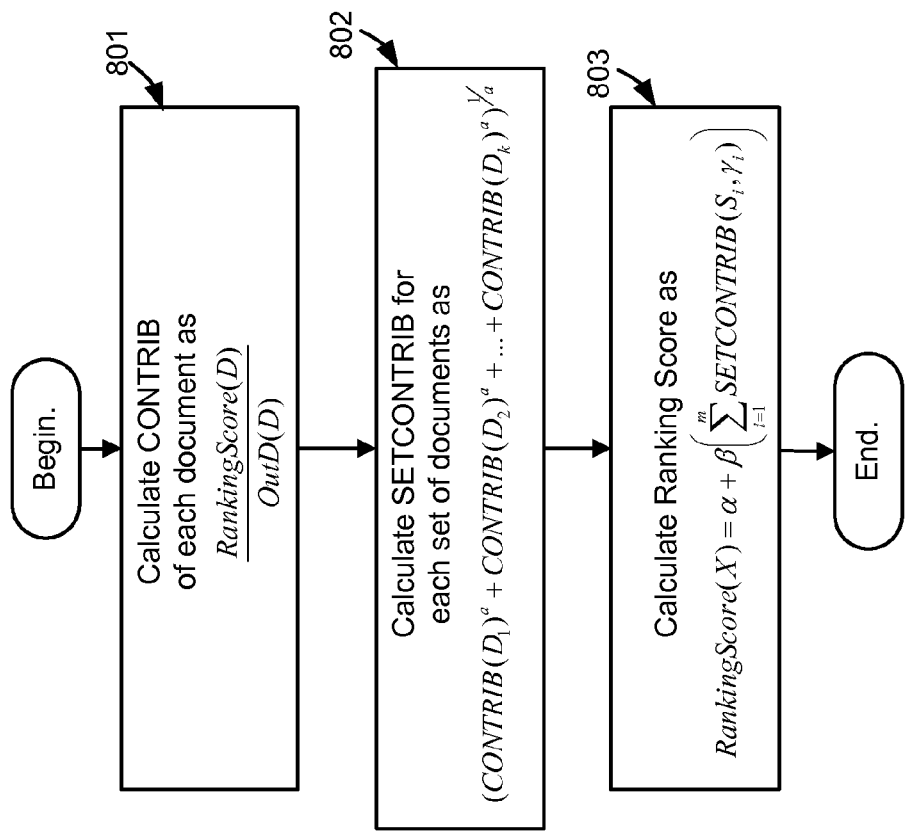
FIG. 8 is a flow chart illustrating operations for calculating ranking scores consistent with an alternate aspect of the invention.

FIG. 8 is a flow chart illustrating operations for calculating ranking scores, as performed in act 602, consistent with an alternate aspect of the invention. In this implementation, the affiliated sets are defined using a continuous model. A degree of affiliation parameter, γ, may be used to measure affiliation, where γ is in the range [0 . . . 1]. A γ value of zero signifies complete affiliation and γ of 1 signifies complete independence.

Ranking component 410 may begin by calculating the contribution value, CONTRIB(D), for each document D as calculated in equation (1) (act 801). Ranking component 410 may next calculate SETCONTRIB(S), for each set S of documents, using a modified version of SETCONTRIB that takes γ into account. More particularly, ranking component 410 may calculate, for each set S, that has a corresponding value of $\gamma_i$, SETCONTRIB($S_i,\gamma_i$) as:

$$(CONTRIB(D_1)^{a_i} + CONTRIB(D_2)^{a_i} + \ldots + CONTRIB(D_k)^{a_i})^{1/a_i}, \quad (Eq.\ 4)$$

where $$a_i = \frac{1}{e + (1-e)\gamma_i}. \quad (Eq.\ 5)$$

In one implementation, e is assigned the value 0.05.

The ranking scores for the documents may be computed from the SETCONTRIB values as $$RankingScore(X) = \alpha + \beta \left( \sum_{i=1}^{m} SETCONTRIB(S_i, \gamma_i) \right). \quad (Eq.\ 6)$$

(Act 803). In equation (6), RankingScore(X) is the ranking score of document X, α and β are constants, and the sum is taken over the m sets that contain documents that link to document X.

The ranking scores calculated by rank computation component 410 using equations (4)-(6) are based on the link structure of the documents and on a continuous measure of affiliation between the documents. In the completely independent case (γ=1), equation (4) evaluates as a Summation function, while in the completely affiliated case (γ=0), equation (4) tends towards the Maximum function. As in the first implementation of rank computation component 410, although the operations of rank component 410 were described in a particular order, one of ordinary skill in the art will recognize that the operations could be performed in a different order or simultaneously.

One of ordinary skill in the art will recognize that modifications can be made to the described implementations when calculating ranking scores based on both document links and affiliation. In particular, in one possible variant of the above techniques, CONTRIB(D) for a document D may be defined as $$\frac{RankingScore(D)}{MAX(1, OutD(D) - THRESHOLD)}, \quad (Eq.\ 7)$$

where THRESHOLD is set to a predetermined value, such as 10. This implementation tends to move the calculation of the ranking scores from a stochastic model to a voting model, where for pages with medium to low links, every endorsement link carries the full weight of the source page.

In another possible variation, concepts consistent with the principles of the invention, instead of operating on documents, may operate on groups of one or more documents ("nodes"). In the context of the Internet, a node may refer to a web site, each of which may contain one or more web pages. An affiliated set of nodes may be, for example, nodes that are under control of a common entity.

Exemplary Implementation

Figure 9:
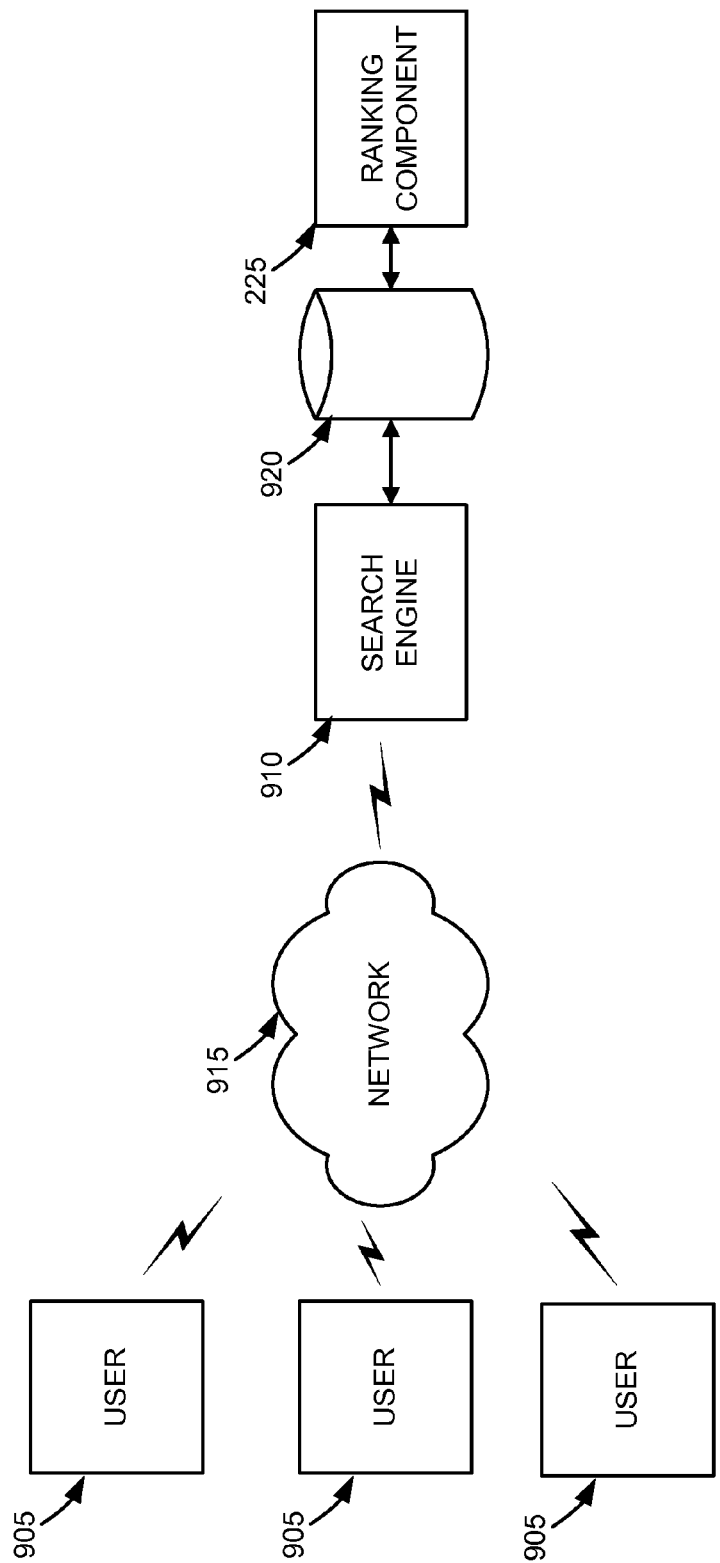
FIG. 9 is a diagram illustrating an exemplary implementation of the ranking component in the context of an Internet search engine.

FIG. 9 is a diagram illustrating an exemplary implementation of ranking component 225 with an Internet search engine. A number of users 905 may connect to a search engine 910 over a network 915, such as the Internet. Search engine 910 may be a traditional search engine that returns a ranked set of documents related to a user query. Search engine 910 may be a general search engine, such as one based on all documents from a large collection, such as documents on the web, or a more specialized search engine, such as a news search engine. In other implementations, search engine 910 may be implemented over a specialized corpus of documents, such as a corporate document database made available over a corporate network 915.

In operation, search engine 910 may receive a user query and generate a list of documents that contain the terms of the user query. Search engine 910 may sort the documents in the list based on a number of factors, including the ranking scores computed for each of the documents in the list. The ranking scores may be generated by ranking component 225 using the above described techniques. In one implementation, the ranking scores may be generated ahead of time and stored in database 920. Search engine 910 may then simply look-up the ranking score of any particular document in database 920.

Conclusion

Techniques for assigning ranking values to documents in a linked database were described. The calculated ranking values balance the concept of each linking document being able to contribute to the ranking value of a document with the concept of affiliated documents.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results. Additionally, although primarily described in the context of web sites on the Internet, the concepts discussed above could be applied to other entities that can be modeled as a linked graph of homogeneous nodes. Examples may include reference papers that cite other reference papers, vendor/customer relationships among companies, social networks, etc.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method performed by one or more devices, the method comprising:
    identifying, by one or more processors of the one or more devices, a plurality of documents,
        a first document, of the identified plurality of documents, being linked to by a second document, of the identified plurality of documents,
            the second document and a third document, of the identified plurality of documents, being in a set of affiliated documents;
    calculating, by one or more processors of the one or more devices, a first value for each document in the set of affiliated documents,
        calculating the first value for each document in the set of affiliated documents being based on:
            a ranking score of the document, and
            a number of outbound links from the document;
    determining, by one or more processors of the one or more devices, that the first value calculated for the third document is a maximum of the first values calculated for each document in the set of affiliated documents;
    assigning, by one or more processors of the one or more devices, a ranking score to the first document based on the first value calculated for the third document; and
    storing, by one or more processors of the one or more devices, the ranking score.

2. The method of claim 1, further comprising:
    sorting a group of the identified plurality of documents, including the first document, based on the ranking score; and
    presenting information identifying the sorted group of the identified plurality of documents to a user.

3. The method of claim 1, further comprising:
    identifying affiliations among a plurality of documents in the set of affiliated documents based on at least one of:
        a link graph structure of the plurality of documents in the set of affiliated documents,
        traffic patterns associated with the plurality of documents in the set of affiliated documents,
        similarity of hostnames of the plurality of documents in the set of affiliated documents, or
        similarity of Internet Protocol (IP) addresses of the plurality of documents in the set of affiliated documents.

4. The method of claim 1, further comprising:
    identifying affiliations among a plurality of documents in the set of affiliated documents based on traffic patterns between the plurality of documents in the set of affiliated documents,
        documents, of the plurality of documents in the set of affiliated documents, with a strong affiliation having a similar traffic pattern.

5. The method of claim 1, where assigning the ranking score includes iteratively assigning the ranking score until convergence.

6. The method of claim 5, further comprising:
    normalizing the ranking score after the iterative assignment of the ranking score is complete.

7. The method of claim 1, where affiliation among a plurality of documents in the set of affiliated documents is defined by a binary model of affiliation.

8. The method of claim 1, where affiliation among a plurality of documents in the set of affiliated documents is defined by a continuous model of affiliation.

9. A system comprising:
    one or more processors to:
        identify a plurality of documents,
            a first document, of the identified plurality of documents, being linked to by a second document, of the identified plurality of documents,
                the second document and a third document, of the identified plurality of documents, being in a set of affiliated documents;
        calculate a first value for each document in the set of affiliated documents,
            calculating the first value for each document in the set of affiliated documents being based on:
                a ranking score of the document, and
                a number of outbound links from the document;
        determine that the first value calculated for the third document is a maximum of the first values calculated for each document in the set of affiliated documents;
        assign a ranking score to the first document based the first value calculated for the third document; and
        store the ranking score.

10. The system of claim 9, where the one or more processors are further to:
    sort a group of documents in the identified plurality of documents, including the first document, based on the ranking score; and
    present information identifying the sorted group of documents to a user.

11. The system of claim 9, where the one or more processors are further to:
    identify affiliations among a plurality of documents in the affiliated set of documents based on at least one of:
        a link graph structure of the plurality of documents in the affiliated set of documents,
        traffic patterns associated with the plurality of documents in the affiliated set of documents,
        similarity of hostnames of the plurality of documents in the affiliated set of documents, or
        similarity of Internet Protocol (IP) addresses of the plurality of documents in the affiliated set of documents.

12. The system of claim 9, where the one or more processors are further to:
    identify affiliations among a plurality of documents in the affiliated set of documents based on traffic patterns between the plurality of documents in the affiliated set of documents, documents, of the plurality of documents in the set of affiliated documents, with a strong affiliation having a similar traffic pattern.

13. The system of claim 9, where, when assigning the ranking score, the one or more processors are further to iteratively assign the ranking score until convergence.

14. The system of claim 13, where the one or more processors are further to:
normalize the ranking score after the iterative assignment of the ranking score is complete.

15. The system of claim 9, where affiliation among a plurality of documents in the affiliated set of documents is defined by a binary model of affiliation.

16. A non-transitory computer-readable medium storing instructions, the instructions comprising:
one or more instructions that, when executed by one or more processors, cause the one or more processors to:
identify a plurality of documents,
a first document, of the plurality of documents, being linked to by a second document, of the plurality of documents,
the second document and a third document, of the plurality of documents, being in a set of affiliated documents;
calculate a first value for each document in the set of affiliated documents,
calculating the first value for each document in the set of affiliated documents being based on:
a ranking score of the document, and
a number of outbound links from the document;
determine that the first value calculated for the third document is a maximum of the first values calculated for each document in the set of affiliated documents;
assign a ranking score to the first document based on the first value calculated for the third document; and
store the ranking score.

17. The non-transitory computer-readable medium of claim 16, where the instructions further comprise:
one or more instructions that, when executed by the one or more processors, cause the one or more processors to:
sort a group of documents in the plurality of documents, including the first document, based on the ranking score; and
present information identifying the sorted group of documents to a user.

18. The non-transitory computer-readable medium of claim 16, where the instructions further comprise:
one or more instructions that, when executed by the one or more processors, cause the one or more processors to:
identify affiliations among a plurality of documents in the affiliated set of documents based on at least one of:
a link graph structure of the plurality of documents in the affiliated set of documents,
traffic patterns associated with the plurality of documents in the affiliated set of documents,
similarity of hostnames of the plurality of documents in the affiliated set of documents, or
similarity of Internet Protocol (IP) addresses of the plurality of documents in the affiliated set of documents.

19. The non-transitory computer-readable medium of claim 16, where the instructions further comprise:
one or more instructions that, when executed by the one or more processors, cause the one or more processors to:
identify affiliations among a plurality of documents in the affiliated set of documents based on traffic patterns between the plurality of documents in the affiliated set of documents,
documents, in the plurality of documents in the affiliated set of documents, with a strong affiliation having a similar traffic pattern.

20. The non-transitory computer-readable medium of claim 16, where the one or more instructions to assign the ranking score include:
one or more instructions that, when executed by the one or more processors, cause the one or more processors to:
iteratively assign the ranking score until convergence, and
normalize the ranking score after the iterative assignment of the ranking score is complete.

* * * * *